dine and piperidine by condensation, in an aminolysis type reaction, with the alkyl esters of unsubstituted saturated aliphatic carboxylic acids and with the alkyl esters of aromatic acids such as benzoic acid, in the presence of a simultaneously condensing and hydrogenating catalyst, in the reaction mixture.

United States Patent Office 3,163,651
Patented Dec. 29, 1964

3,163,651
PROCESS FOR PREPARING HETEROCYCLIC TERTIARY AMINES
Augusto Segre and René Viterbo, Naples, Italy, assignors to S.p.A. Farmochimica Cutolo-Calosi, Naples, Italy, a company of Italy
No Drawing. Filed May 23, 1961, Ser. No. 111,903
Claims priority, application Italy, Oct. 15, 1957, 14,871/57, 14,875/57
12 Claims. (Cl. 260—293)

This invention relates to a method for preparing heterocyclic tertiary amines. This application is a continuation-in part of our co-pending applications Serial Nos. 765,288 and 765,289, both filed on October 6, 1958, and both now abandoned.

The importance of organic substances containing tertiary amino groups, and in particular heterocyclic tertiary amines is universally acknowledged. Particularly, such tertiary amines are members of, or intermediates for the broad class of alkaloids which has found many applications in the therapeutical field.

General methods for the synthesis of tertiary amines have therefore been elaborated and are used in large number.

Among the various methods known in the art, one is the simple and economical process which comprises reacting primary amine such as aniline under substantially anhydrous conditions and in the presence of an elementary alkali metal or an alkali metal hydride as catalyst at a temperature of about 200° C. and at a pressure of about 800 to 1000 atmospheres with an unsaturated acyclic hydrocarbon such as ethylene.

Further industrially applicable processes involve the reduction of nitriles, by Curtius or Hofmann degradation and many others.

Another theoretically possible route is the following:

Tertiary amides have been obtained by the well known aminolysis described, for instance by Fieser & Fieser, "Organic Chemistry" (1944), page 183, by reacting secondary unoxidized cyclic amines such as piperidine with the alkyl esters of unsubstituted saturated aliphatic carboxylic acids, such as methyl acetate. However, at 25° C., the reactivity of the secondary amines in aminolysis is so low that this reaction does not lend itself to industrial use. Thus the rate constant for reaction rates of 10% completion between piperidine and methyl acetate in methanol as solvent is only $0.47 \times 10^{-3}$, while in the presence of sodium methylate as catalyst in the solvent, it is still only $5.2 \times 10^{-3}$ liters per mole per hour. After 10% completion the constant decreases even further. (Baltzly and co-workers, J.A.C.S., 72 4149–4152 (1950).)

The conversion of tertiary amides to the corresponding tertiary amines having the same number of carbon atoms has been carried out with lithium aluminum hydride as the hydrogenation catalyst (Krajkeman, Manufacturing Chemist, XXII, 4, page 150). In view of the unsatisfactory yields of the aminolysis of esters with secondary amines, this route has not attained practical value in the production of tertiary amines.

It is an object of our invention to provide a novel process for the production of heterocyclic tertiary amines which uses readily available starting materials, while avoiding the high temperatures and pressures required by the first-mentioned known process and other drawbacks such as more limited availability of the starting materials and/or low reaction rates of the other known processes.

It is a further object of our invention to provide a novel process for the production of heterocyclic amines which permits use of the aminolysis route with satisfactory yields.

We have now discovered that tertiary amines can be produced rapidly with good yields directly from readily available heterocyclic secondary amines such as pyrrolidine and piperidine by condensation, in an aminolysis type reaction, with the alkyl esters of unsubstituted saturated aliphatic carboxylic acids and with the alkyl esters of aromatic acids such as benzoic acid, in the presence of a simultaneously condensing and hydrogenating catalyst, in the reaction mixture.

We have further found that alkali metal aluminum hydrides and particularly lithium aluminum hydride act as such condensation-hydrogenation catalysts.

The method of the present invention therefore comprises, in the first line, treating a cyclic secondary amine the nitrogen atom of which is included in the ring, and preferably an amine of the aforesaid type in which all other atoms of the ring are carbon atoms, with an ester of the type of carboxylic acid defined above, in the presence of lithium aluminum hydride. A mixture is thereby produced, wherefrom the cyclic tertiary amine is recovered, according to the following general reaction scheme:

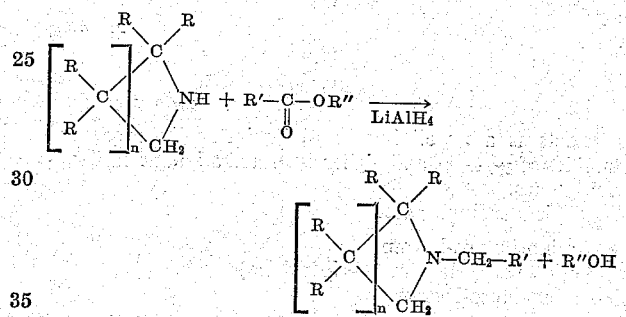

wherein $n$ is an integer from 0 to three; each R represents either a hydrogen atom, or alkyl of up to three carbon atoms; R' is an oxygen-free saturated aliphatic or cycloaliphatic or an aromatic group; R" represents an alkyl group of maximally seven carbon atoms, or alicyclic radicals. When R' is an aromatic radical, R" can also be the same or another aromatic radical.

While it is well known that there is a selected group of solvents, in particular the alcohols, and among the latter the glycols, which catalyze the reaction between the ester and the secondary amine somewhat as has been mentioned hereinbefore, such catalytic effect is not sufficient to obtain satisfactory yields. No alkylation of cyclic secondary amines with esters of carboxylic acids (as potential alkylating agents) in the presence of lithium aluminum hydride as reducing and condensing agent, has been known in the past.

If the above-defined two reactants are reacted with each other under otherwise identical conditions, but in the total absence of lithium aluminum hydride, the starting materials are quantitatively recovered. This demonstrates that $LiAlH_4$ is necessary during the reaction not only as a reducing agent, for in that event, the corresponding amide and alcohol would be recovered, but also a condensing agent.

The above mentioned cycloaliphatic groups contain from two to six carbon atoms in the ring and the aromatic groups are five or six membered rings exclusive of carbon atoms and are preferably mononuclear.

According to another preferred mode of carrying out the method of our invention, a lactam is treated with a carboxylic acid ester in the presence of lithium aluminum hydride and a mixture is obtained wherefrom a cyclic tertiary amine is isolated. When the "lactam" group and the "carboxylic acid ester group" are present in the same molecule, there is isolated from the resulting mixture a bicyclic tertiary amine wherein a novel ring is formed and closed on the nitrogen atom of the lactam.

This mode of carrying out our invention thus has the feature of starting from lactam and carboxylic acid esters to obtain teritiary amines, the nitrogen atom of which belongs to a ring, having the above-stated general formula

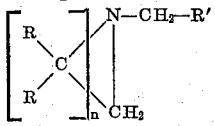

wherein R, R' and $n$ have the above-given definitions.

If a solution of a lactam, for instance α-piperidone in a suitable organic solvent and of a carboxylic acid ester, for instance the ethyl ester of acetic acid, is reacted with lithium aluminum hydride (LiAlH₄) a mixture is obtained wherefrom a cyclic tertiary amine is recovered. The reaction may be set out in the general terms:

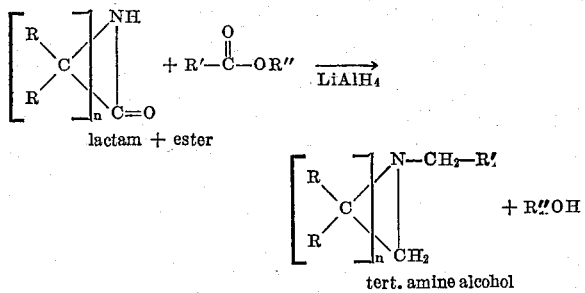

Lactams are well known to be internally condensed amides of γ-, δ-, ε-, and higher saturated aliphatic carboxylic amides.

Typical examples are:

γ-Amino butyro-lactam
δ-Amino-valero-lactam (α-piperidone)
ε-Amino-capro-lactam

Similar lactams are those derived from γ (δ)-amino suberic acid and similar dicarboxylic saturated aliphatic acids. These lactams are readily accessible and the caprolactam is manufactured industrially on a large scale.

In the particular case hereinbefore disclosed, starting from α-piperidone and ethyl acetate, in the presence of lithium aluminum hydride, N-ethyl-piperidine will be obtained. The reaction may be described by the following formula:

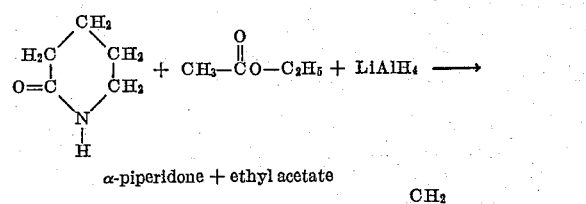

If the benzyl ester of benzoic acid is substituted by the ethyl ester of acetic acid N-benzyl-piperidine will be obtained. The reaction may be represented by the following formula:

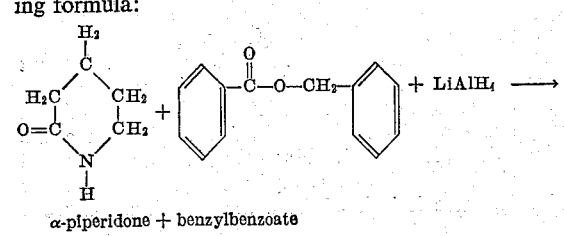

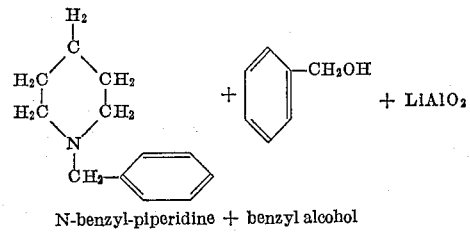

N-benzyl-piperidine + benzyl alcohol

The synthesis of the tertiary amines by the method of the present invention can also be applied if the lactam group and the carboxylic ester group belong to the same molecule. In this case a cyclization occurs on the nitrogen atom as exemplified here-after.

If the methyl ester of the 1→5 lactam of 5-amino-suberic acid is treated with lithium aluminum hydride, a mixture is obtained, wherefrom delta-coniceine, a natural bicyclic alkaloid, is isolated. The following formula represents this reaction:

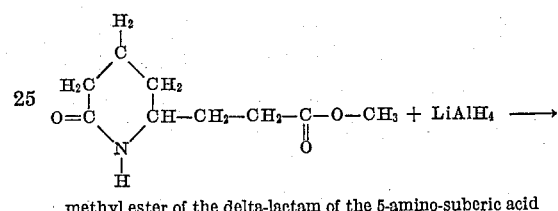

methyl ester of the delta-lactam of the 5-amino-suberic acid

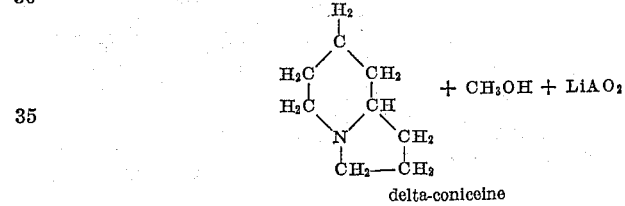

delta-coniceine

All of the above-described reactions in both modes of our method are carried out in the liquid phase, with a suitable anhydrous organic solvent free from hydroxyl groups such as diethyl ether, at a temperature of about 20 to 40° C. and preferably 35 to 37° C. and under atmospheric pressure.

In the above mentioned reactions lithium aluminum hydride acts both as a reducing agent and as a condensing agent. It would be possible to think, at first sight, that the lithium aluminum hydride acts only as a reducing agent on the lactam function forming a secondary amine which would undergo a condensation with the ester group without any intervention of lithium aluminum hydride. The amine group so formed would be then reduced by lithium aluminum hydride to a tertiary amine. This however is not true. In fact if a secondary amine is treated with a carboxylic ester under the same mild conditions as hereinbefore described but in the absence of lithium aluminum hydride, the starting materials are quantitatively recovered. Thus it is demonstrated that in the reaction of a lactam with a carboxylic acid ester in the presence of lithium aluminum hydride, the latter acts as a reducing agent as well as a condensing agent.

The reducing action of the lithium aluminum hydride is well known. However, its action as a condensing agent between lactams and esters of carboxylic acid is new.

In both modes of carrying out the method of our invention in practice, the solvent in which the reaction takes place, and in which the catalyst is suspended must be inert; dialkyl ethers are preferred, and among these diethyl ether is the most easily available solvent.

The last described synthesis of bicyclic tertiary amines in which at least the nitrogen atom and one carbon atom are common to both rings, is of particular importance in the synthesis of alkaloid structures.

The starting compounds in this type of syntheses according to the invention are especially the mono-lactams of dicarboxylic saturated aliphatic amino-acids wherein the amino group is in γ-position or even farther removed from the carboxylic acid group with which it forms the lactam. The other carboxylic acid group is esterified before the lactam is formed.

Processes for the preparation of such lactams are described, for instance, in R. E. Eldorfield, Heterocyclic Compounds, vol. I, page 651, John Wiley and Sons, New York, 1950.

In these syntheses lithium aluminum hydride acts simultaneously as a condensation, cyclization and reducing catalyst.

The present invention will be described hereinafter with reference to some typical examples.

EXAMPLE 1

*N-Ethyl-Pyrrolidine*

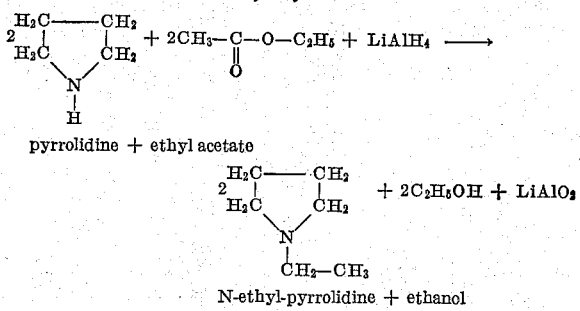

pyrrolidine + ethyl acetate

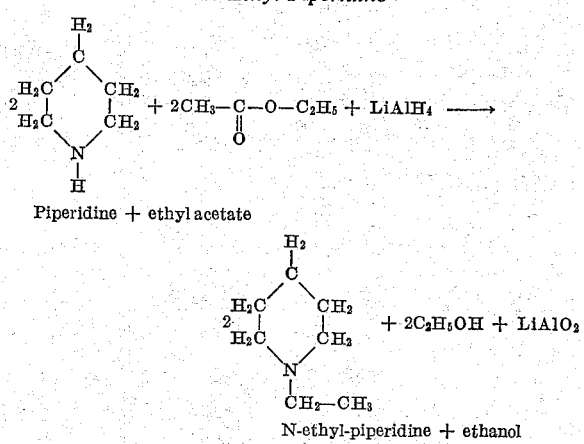

N-ethyl-pyrrolidine + ethanol

An ether solution containing 9.5 grams of pyrrolidine and 8.8 grams of acetic acid ethyl ester is slowly added to a suspension of 3.8 grams of lithium aluminum hydride in 300 cc. of ethyl ether. During the reaction, the mixture is maintained at about 35° C. under atmospheric pressure. At the end of the reaction after about sixty minutes, the excess of lithium aluminum hydride is destroyed by adding water, and the mixture is then subjected to fractionated distillation. 2.815 grams of N-ethyl-pyrrolidine are isolated, B.P. 96° C./760 mm. Hg. Picrate, M.P. 180–182° C.

*Analysis.*—Calculated for $C_{12}H_{16}N_4O_7$: C=43.90%; H=4.92%; N=17.07%. Found: C=43.82%; H=5.25%; N=17.21%.

EXAMPLE 2

*N-Ethyl-Piperidine*

Piperidine + ethyl acetate

N-ethyl-piperidine + ethanol

An ether solution containing 8.55 grams of piperidine and 8.8 grams of acetic acid ethyl ester is slowly added to a suspension containing 3.8 grams of lithium aluminum hydride in ethyl ether, and further treated as described in Example 1.

3.33 grams of N-ethyl-piperidine are isolated, B.P. 120–128° C./760 mm. Hg. The picrate shows an M.P. 165–167° C.

*Analysis.*—Calculated for $C_{13}H_{18}O_7N_4$: C=45.60%; H = 5.31%; N = 16.37%. Found: C = 45.40%; H=5.39%; N=16.52%.

EXAMPLE 3

*N-Benzyl-Piperidine*

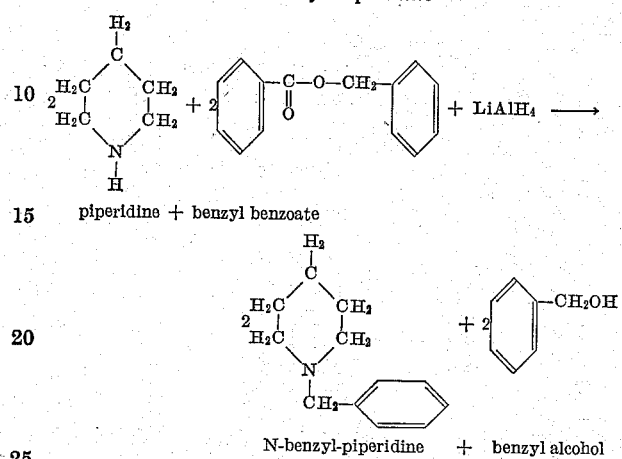

piperidine + benzyl benzoate

N-benzyl-piperidine + benzyl alcohol

In an ether solution of 2.6 grams of piperidine are suspended 0.3 gram of lithium aluminum hydride, and an ether solution containing 7.8 grams of benzoic acid benzylic ester is slowly added. During the ensuing reaction the temperature is held at about 35 to 37° C. At the end of the reaction, after about sixty minutes, 0.6 gram of lithium aluminum hydride are added, and the mixture is left standing for sixty minutes. The excess of lithium aluminum hydride is then destroyed by addition of water, and the mixture is subjected to fractionated distillation. Thereby, 2.6 grams of N-benzyl-piperidine are isolated; B.P. 102–109° C./15 mm. Hg. Picrate; M.P. 176–178° C.

*Analysis.*—Calculated for $C_{18}H_{20}O_7N_4$: C, 53.46%; H, 4.99%; N, 13.86%. Found: C, 53.42%; H, 5.15%; N, 14.15%.

EXAMPLE 4

*Preparation of N-Ethyl-Piperidine From Lactam*

To 4.1 grams of α-piperidone dissolved in 50 cc. of anhydrous ethyl ether and 2.7 grams of acetic acid ethyl ester there are slowly added 2.2 grams of lithium aluminum hydride and the reaction mixture is held under atmospheric pressure at a temperature of 37° C. At the end of the reaction, after about sixty minutes, the excess of lithium aluminum hydride is destroyed by adding water and the mixture is then subjected to fractionated distillation whereby there are recovered 1.6 grams of N-ethyl-piperidine, B.P. 128° C./760 mm. Hg. Picrate, M.P. 165–167° C.

*Analysis.*—Calculated for $C_{13}H_{18}O_7N_4$: C=45.60%; H=5.31%; N=16.37%. Found: C=45.35%; H=5.31%; N=16.49%.

EXAMPLE 5

*Preparation of the N-Benzyl-Piperidine*

4.1 grams of α-piperidone dissolved in 50 cc. of ethyl ether and 5.7 grams of benzoic acid benzylic ester also dissolved in 50 cc. of anhydrous ethyl ether, are treated with 2.2 grams of lithium aluminum hydride in the same manner as described in Example 4. 1.44 grams of N-benzyl-piperidine are recovered, B.P. 94–96°C/15 mm. Hg. Picrate, M.P. 176–178° C.

*Analysis.*—Calculated for $C_{18}H_{20}O_7N_4$: C=53.46%; H=4.99%; N=13.86%. Found: C=53.36%; H=5.07%; N=14.06%.

EXAMPLE 6

*Delta-Coniceine*

4 grams of methyl ester of the 1→5 lactam of 5-amino suberic acid (boiling point 156°–162° C./0.5 mm. Hg) are dissolved in 100 cc. of anhydrous ethyl ether and added to a suspension of 5 grams of lithium aluminum hydride in 500 cc. of anhydrous ethyl ether. The mixture is treated as described in Example 4. 0.447 gram of delta-coniceine are obtained, B.P. 50° C./15 mm. Hg.

*Analysis.*—Calculated for $C_8H_{15}N$: C=76.74%; H=12.08%; N=11.19%. Found: C=76.58%; H=12.02%; N=11.00%.

Picrate: M.P. 226–227° C.

*Analysis.*—Calculated for $C_{14}H_{18}O_7N_4$: C=47.45%; H=5.12%; N=15.81%. Found: C=47.58%; H=5.40%; N=15.92%.

While some specific embodiments of this invention have been described in detail to illustrate the application of the invention principles, it will be understood that the invention may be embodied otherwise without departing from such principles.

We claim:

1. The method described in claim 11, wherein the alcohol moiety of the ester is an alkyl group having from two to seven carbon atoms.
2. The method described in claim 11, wherein the heterocyclic compound is α-piperidone and the ester is benzyl benzoate.
3. The method described in claim 11, wherein the heterocyclic compound is α-piperidone and the ester is methyl acetate.
4. The method described in claim 11 wherein the reaction mixture is heated to a temperature of 37 to 39° C.
5. The method described in claim 11, wherein the inert solvent is an ether.
6. The method described in claim 11, wherein the inert solvent is diethyl ether.
7. The method according to claim 12 wherein the lactam carboxylic acid ester is the methyl ester of the 1→5 lactam of 5-amino-suberic acid.
8. A process as described in claim 11 wherein the heterocyclic compound is pyrrolidine and the ester is ethyl acetate.
9. A process as described in claim 11 wherein the heterocyclic compound is piperidine and the ester is ethyl acetate.
10. A process as described in claim 11 wherein the heterocyclic compound is piperidine and the ester is benzyl benzoate.
11. Process for producing a tertiary amine of the formula

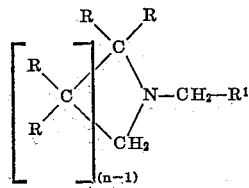

wherein $n$ is an integer from 1 to 4, each R is a member selected from the group consisting of H and lower alkyl, and $R^1$ is a member selected from the group consisting of lower alkyl, cycloalkyl, and monnuclear aromatic hydrocarbon, which comprises mixing a heterocyclic compound of the formula

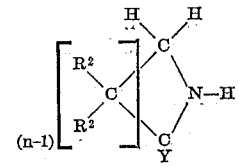

wherein $n$ is an integer of from 1 to 4, each $R^2$ is a member selected from the group consisting of H and lower alkyl, and CY is a member selected from the group consisting of $CH_2$ and C=O; with (*a*) an ester selected from the group consisting of lower alkyl and cycloalkyl esters of lower alkanoic acids, cycoalkanoic acids, and mononuclear aromatic hydrocarbon carboxylic acids, (*b*) lithium aluminum hydride and (*c*) inert organic solvent at a temperature of from 20° to 40° C.

12. Process for producing a teritary amine of the formula

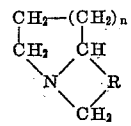

wherein $n$ is an integer from 1 to 2, and R is lower alkylene, which comprises mixing cyclic lactam of the formula

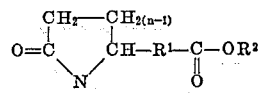

wherein $n$ is an integer from 1 to 2 and each of $R^1$ and $R^2$ is lower alkyl, with (*a*) lithium aluminum hydride and (*b*) an inert organic solvent at a temperature of from 20° to 40° C.

References Cited by the Examiner

Baltzy et al.: Journal of the American Chemical Society, vol. 72, pages 4149–4152 (1950).

Arnett et al.: Journal of the American Chemical Society, vol. 73, pages 5393–5395.

Barry et al.: Proceedings of the Royal Irish Academy, vol. 55–B, pages 137–139 (1953).

Krajkeman: Manufacturing Chemist, vol. 22 [No. 4], pages 149–150 (1951).

Richter's Organic Chemistry, Heterocyclic Compounds, Free Radicals (Textbook), vol. 4, pages 3–5 (1947 Edition), Elsevier Publishing Co., Inc., New York, N.Y.

IRVING MARCUS, *Primary Examiner.*

WALTER A. MODANCE, *Examiner.*